(12) United States Patent
Lin et al.

(10) Patent No.: US 11,330,596 B2
(45) Date of Patent: May 10, 2022

(54) METHOD AND DEVICE FOR INDICATING TRANSMISSION RESOURCES AND STORAGE MEDIUM

(71) Applicant: CHINA ACADEMY OF TELECOMMUNICATIONS TECHNOLOGY, Beijing (CN)

(72) Inventors: Lin Lin, Beijing (CN); Rui Zhao, Beijing (CN); Yuan Feng, Beijing (CN); Jiayi Fang, Beijing (CN); Haijun Zhou, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 485 days.

(21) Appl. No.: 16/324,903

(22) PCT Filed: Aug. 7, 2017

(86) PCT No.: PCT/CN2017/096237
§ 371 (c)(1),
(2) Date: Feb. 11, 2019

(87) PCT Pub. No.: WO2018/028548
PCT Pub. Date: Feb. 15, 2018

(65) Prior Publication Data
US 2021/0298024 A1    Sep. 23, 2021

(30) Foreign Application Priority Data
Aug. 12, 2016   (CN) .................. 201610666591.5

(51) Int. Cl.
*H04W 72/04*   (2009.01)
*H04L 5/00*   (2006.01)
*H04L 47/10*   (2022.01)
*H04W 28/04*   (2009.01)

(52) U.S. Cl.
CPC ....... *H04W 72/0493* (2013.01); *H04L 5/0044* (2013.01); *H04L 5/0053* (2013.01); *H04W 72/042* (2013.01); *H04W 72/044* (2013.01)

(58) Field of Classification Search
None
See application file for complete search history.

(56) References Cited

U.S. PATENT DOCUMENTS

| | | |
|---|---|---|
| 2007/0086457 A1 | 4/2007 | Rune et al. |
| 2007/0168579 A1 | 7/2007 | Croughwell et al. |

(Continued)

FOREIGN PATENT DOCUMENTS

| | | |
|---|---|---|
| CN | 105337706 A | 2/2016 |
| CN | 105517159 A | 4/2016 |

(Continued)

OTHER PUBLICATIONS

Notification of Reason for Refusal from KR app. No. 10-2019-7007239, dated May 19, 2020, with English translation provided by Global Dossier.

(Continued)

*Primary Examiner* — Jay L Vogel
(74) *Attorney, Agent, or Firm* — Ladas & Parry, LLP

(57) ABSTRACT

A method and a device for indicating transmission resources, and a storage medium are provided. The method includes: selecting N transmissions according to a target indication rule, and determining N transmission resources of data information of a data packet corresponding to the N transmissions as selected; and transmitting in control information the N transmission resources as determined.

12 Claims, 1 Drawing Sheet selecting N transmissions according to a target indication rule, and determining N transmission resources of data information of a data packet corresponding to the N transmissions as selected — 11 transmitting in the control information the N transmission resources as determined — 12

(56) References Cited

U.S. PATENT DOCUMENTS

| | | | |
|---|---|---|---|
| 2010/0208609 A1 | 8/2010 | Sundarraman et al. | |
| 2012/0131223 A1 | 5/2012 | Watson et al. | |
| 2016/0044729 A1* | 2/2016 | Tu | H04W 72/02 370/329 |
| 2017/0230165 A1* | 8/2017 | Yang | H04W 72/0446 |
| 2017/0303277 A1 | 10/2017 | Wang et al. | |
| 2019/0059115 A1* | 2/2019 | Uchiyama | H04W 56/002 |
| 2020/0195389 A1* | 6/2020 | Basu Mallick | H04W 72/02 |
| 2020/0322923 A1* | 10/2020 | Yasukawa | H04W 4/44 |

FOREIGN PATENT DOCUMENTS

| | | |
|---|---|---|
| TW | 200526051 A | 8/2005 |
| TW | 200805969 A | 1/2008 |
| TW | 201036474 A | 10/2010 |
| TW | 201228321 A | 7/2012 |
| WO | 2015/142429 A1 | 9/2015 |
| WO | 2015171048 A1 | 11/2015 |
| WO | 2016022716 A1 | 2/2016 |
| WO | 2016045437 A1 | 3/2016 |

OTHER PUBLICATIONS

"Data transmission in D2D communication", R1-141998, 3GPP TSG RAN WG1 Meeting #77, Seoul, Korea, May 19-23, 2014.

"RPT design for broadcast communication", R1-142077, 3GPP TSG RAN WG1 Meeting #77, Seoul, Korea, May 19-23, 2014.

Extended European Search Report from EP app. No. 17838678.5, dated Jun. 3, 2019.

Office Action from TW app. No. 10720718340, dated Aug. 8, 2018, with machine English translation.

Written Opinion of the International Searching Authority from PCT/CN2017/096237, dated Oct. 26, 2017, with English translation from WIPO.

International Preliminary Report on Patentability from PCT/CN2017/096237, dated Feb. 12, 2019, with English translation from WIPO.

Notice of reasons for refusal from JP app. No. 2019-505532, dated Feb. 12, 2020, with English translation from Global Dossier.

Ericsson, Contents of PSCCH for V2V over PC5, 3GPP TSG RAN WG 1 Meeting #85, RI-165264, May 13, 2016 (May 13, 2016), section 2.

CATT, Discussion on Contents of Scheduling Assignment, 3GPP TSG RAN WG 1 Meeting #84bis, RI-162275, Apr. 2, 2016 (Apr. 2, 2016), section 2.

International Search Report for PCT /CN2017/096237 dated Oct. 26, 2017 and its English translation provided by WIPO.

Written Opinion for PCT /CN2017/096237 dated Oct. 26, 2017 and its English translation provided by Google Translate.

Office Action from TW app. No. 10612856, dated Aug. 8, 2018, with machine English translation.

* cited by examiner

METHOD AND DEVICE FOR INDICATING TRANSMISSION RESOURCES AND STORAGE MEDIUM

CROSS-REFERENCE TO RELATED APPLICATIONS

This application is the U.S. National Stage of International Patent Application No. PCT/CN2017/096237 filed on Aug. 7, 2017, which claims the priority to Chinese Patent Application No. 201610666591.5 filed in the Chinese Intellectual Property Office on Aug. 12, 2016, the disclosures of which are incorporated herein in their entireties.

TECHNICAL FIELD

The present disclosure relates to the technical field of communications, and in particular to a method and a device for indicating transmission resources, and a storage medium.

BACKGROUND

In the related technology, time-frequency positions of Data (data information) resources need to be indicated by scheduling assignment SA (control information), and in order to improve success rate of data decoding, resources of initial transmission and retransmission of a data packet may require to be indicated. For example, resources of one initial transmission plus several retransmissions may need to be indicated. If all the resources of initial transmission and retransmission can be indicated in the SA, a receiving terminal will know a resource occupation status more clearly and timely. But this may not be achieved in many cases. One of the reasons is that an SA payload is limited, and the second reason is that the maximum quantity of times for which data packet is transmitted may be variable.

In order to reduce the complexity of blind detection, the payload of SA is invariable, and the quantity of transmissions indicated in the SA is also invariable. Generally, the SA may indicate resources of N transmissions in total for a data packet including resource of a current transmission and resources of transmissions subsequent to the current transmission. However, if the current transmission is the last retransmission, or even the (N−1)-th transmission to last, an invalid field may appear in the SA since there are not N transmissions left from the current transmission for the SA to indicate, resulting in waste. Moreover, from another perspective, the previous several transmissions obtain fewer indications than the subsequent transmissions. For example, an initial transmission is only indicated once, and if the unique SA for indicating resource of the initial transmission fails to be decoded, a position of the resource of the initial transmission can not be obtained by decoding the SA, and other terminals can not deterministically exclude the occupied initial resource when selecting resources, which apparently reduces transmission reliability.

In summary, the conventional SA indication manner has a problem of wasting domain and has low transmission reliability.

SUMMARY

The present disclosure is to provide a method and a device for indicating transmission resources, for solving the problem that the SA indication manner in the related technology causes domain waste and has low transmission reliability.

In view of the above, a method for indicating transmission resources is provided according to the present disclosure. The method includes:

selecting N transmissions according to a target indication rule, and determining N transmission resources of data information of a data packet corresponding to the N transmissions as selected, where N is the maximum quantity of transmissions indicated by control information for indicating transmission resources, and N is an integer greater than or equal to 2; and transmitting, in the control information, the N transmission resources as determined.

Before selecting the N transmissions according to the target indication rule, the method further includes:

receiving a preset indication rule transmitted by a network side, where the preset indication rule includes one or more indication rules; and selecting one indication rule from the preset indication rule as the target indication rule.

In a case that the preset indication rule includes multiple indication rules, when transmitting, in the control information, the N transmission resources as determined, the method further includes:

transmitting, in the control information, indication information for indicating the target indication rule currently adopted by a node.

The transmission resources of the data information include a time-domain resource of the data information and a frequency-domain resource of the data information.

The N transmissions as selected are N transmissions including a current transmission.

The N transmissions as selected includes a current transmission, and N−1 transmissions selected from the current transmission according to a continuous sequential cycle rule, or an odd-even cycle rule, or a preset cycle rule.

The continuous sequential cycle rule includes:

selecting in sequence, starting from the current transmission and according to serial numbers of transmissions; and skipping to a first one of the transmissions in a case that a last one of the transmissions has been selected, and selecting again in sequence, starting from the first one of the transmissions and according to the serial numbers of the transmissions.

The odd-even cycle rule includes:

selecting in sequence, starting from the current transmission and according to serial numbers of odd-numbered transmissions or serial numbers of even-numbered transmissions; and skipping to a first one of the odd-numbered transmissions or a first one of the even-numbered transmissions in a case that a last one of the odd-numbered transmissions or a last one of the even-numbered transmissions has been selected, and selecting again in sequence, starting from the first one of the odd-numbered transmissions or the first one of the even-numbered transmissions and according to the serial numbers of the odd-numbered transmissions or the serial numbers of the even-numbered transmissions.

The preset cycle rule includes:

selecting one or more transmissions, staring from the current transmission to a last one of the transmissions and according to a first rule; and skipping to a first one of the transmissions that satisfies a second rule in a case that a last one of the transmissions that satisfies the first rule has been selected, and selecting one or more transmissions, starting from the first one of the transmissions that satisfies the second rule and according to the second rule, where the first rule includes selecting in sequence according to serial numbers of the transmissions, or, selecting in sequence according to the serial numbers of transmissions whose serial numbers modulo N1 evaluate to M1, and where the second rule includes selecting in sequence according to the serial numbers of the transmissions, or, selecting in sequence according to the serial numbers of transmissions whose serial numbers modulo N2 evaluate to M2, where N1, N2, M1 and M2 are integers, N1>M1, and N2>M2.

A device for indicating transmission resources is further provided according to an embodiment of the present disclosure. The device includes:

a resource determining module, configured to select N transmissions according to a target indication rule, and determine N transmission resources of data information of a data packet corresponding to the N transmissions as selected, where N is the maximum quantity of transmissions indicated by control information for indicating transmission resources, and N is an integer greater than or equal to 2; and a transmitting module, configured to transmit, in the control information, the N transmission resources as determined.

The device further includes:

a receiving module, configured to receive a preset indication rule transmitted by a network side, where the preset indication rule including one or more indication rules; and a selecting module, configured to select one indication rule from the preset indication rule as the target indication rule.

The transmitting module is further configured to transmit, in the control information, indication information for indicating the target indication rule currently adopted by a node, in a case that the preset indication rule includes multiple indication rules.

The transmission resources of the data information include a time-domain resource of the data information and a frequency-domain resource of the data information.

The N transmissions as selected are N transmissions including a current transmission.

The N transmissions as selected includes a current transmission, and N−1 transmissions selected from the current transmission according to a continuous sequential cycle rule, or an odd-even cycle rule, or a preset cycle rule.

The continuous sequential cycle rule includes:

selecting in sequence, starting from the current transmission and according to serial numbers of transmissions; and skipping to a first one of the transmissions in a case that a last one of the transmissions has been selected, and selecting again in sequence, starting from the first one of the transmissions and according to the serial numbers of the transmissions.

The odd-even cycle rule includes:

selecting in sequence, starting from the current transmission and according to serial numbers of odd-numbered transmissions or serial numbers of even-numbered transmissions; and skipping to a first one of the odd-numbered transmissions or a first one of the even-numbered transmissions in a case that a last one of the odd-numbered transmissions or a last one of the even-numbered transmissions has been selected, and selecting again in sequence, starting from the first one of the odd-numbered transmissions or the first one of the even-numbered transmissions and according to the serial numbers of the odd-numbered transmissions or the serial numbers of the even-numbered transmissions.

The preset cycle rule includes:

selecting one or more transmissions, staring from the current transmission to a last one of the transmissions and according to a first rule; and skipping to a first one of the transmissions that satisfies a second rule in a case that a last one of the transmissions that satisfies the first rule has been selected, and selecting one or more transmissions, starting from the first one of the transmissions that satisfies the second rule and according to the second rule, where the first rule includes selecting in sequence according to serial numbers of the transmissions, or, selecting in sequence according to the serial numbers of transmissions whose serial numbers modulo N1 evaluate to M1, and where the second rule includes selecting in sequence according to the serial numbers of the transmissions, or, selecting in sequence according to the serial numbers of transmissions whose serial numbers modulo N2 evaluate to M2, where N1, N2, M1 and M2 are integers, N1>M1, and N2>M2.

A device for indicating transmission resources is further provided according to an embodiment of the present disclosure. The device includes:

a processor; and a transceiver, configured to transmit and receive data under control of the processor, where the processor is configured to perform following operations:

selecting N transmissions according to a target indication rule, and determining N transmission resources of data information of a data packet corresponding to the N transmissions as selected, where N is the maximum quantity of transmissions indicated by control information for indicating transmission resources, and N is an integer greater than or equal to 2; and transmitting, in the control information, the N transmission resources as determined.

A non-volatile computer readable storage medium is further provided according to an embodiment of the present disclosure, which stores computer readable instructions executable by a processor. When the computer readable instructions are executed by the processor, the processor is configured to perform following operations:

selecting N transmissions according to a target indication rule, and determining N transmission resources of data information of a data packet corresponding to the N transmissions as selected, where N is the maximum quantity of transmissions indicated by control information for indicating transmission resources, and N is an integer greater than or equal to 2; and transmitting, in the control information, the N transmission resources as determined.

The above technical solutions of the present disclosure at least have the following beneficial effects.

According to the method and device for indicating the transmission resources provided by the embodiments of the present disclosure, transmission resources indicated by the control information for indicating the transmission resources each time are the transmission resources corresponding to the maximum quantity of transmissions that the control information can indicate, which avoids waste of an indication field in the control information. Moreover, the transmission resources of the data information corresponding to the data packet are indicated according to the preset rule by adopting the indication field in the control information, thereby improving the probability of successfully decoding the data packet. In addition, in a case that the transmission resources of the data information are periodically occupied, a receiving node can improve the accuracy of determining a resource occupation status according to indication of the control information.

DETAILED DESCRIPTION

In order to better clarify technical problem to be solved, technical solutions and advantages of the present disclosure, descriptions are provided hereinafter in detail in conjunction with specific embodiments and drawings.

Figure 1:
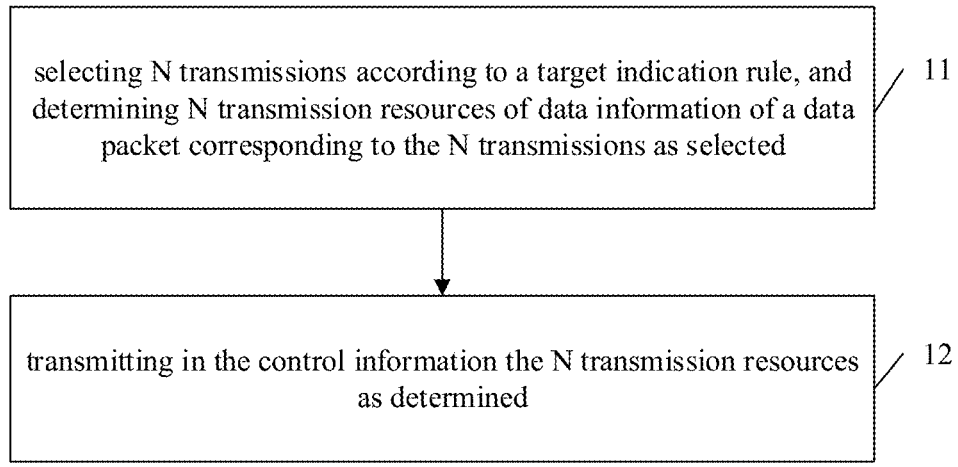
FIG. 1 is a flow chart of basic steps of a method for indicating transmission resources according to an embodiment of the present disclosure.

As shown in FIG. 1, a method for indicating transmission resources is provided according to an embodiment of the present disclosure. The method includes:

step 11, selecting N transmissions according to a target indication rule, and determining N transmission resources of data information of a data packet corresponding to the N transmissions as selected, where N is the maximum quantity of transmissions that control information for indicating transmission resources is capable of indicating, and N is an integer greater than or equal to 2; and step 12, transmitting, in the control information, the N transmission resources as determined.

It should be noted that control information (SA) is associated with data information (data), that is, transmission resources of the data is indicated in the control information SA. The SA and the data may be transmitted in a same subframe or in different subframes, and the SA requires to be transmitted no later than the data associated with the SA.

In the embodiment of the present disclosure, N is the maximum quantity of times of transmissions that the SA is capable of indicating, that is, an indication field of the SA may at most indicate transmission resources corresponding to the data information of the N transmissions. In the embodiment of the present disclosure, in order to avoid waste of the indication field of the SA, the N transmission resources are carried in the SA each time the SA is transmitted. The N transmission resources carried in the SA are transmission resources of the data of a same data packet.

For example, when N is equal to 4, it is assumed that one data packet requires to be transmitted for six times in total (including one initial transmission and five retransmissions), which are respectively referred to as a first transmission, a second transmission, a third transmission, a fourth transmission, a fifth transmission and a sixth transmission. The four transmissions selected according to the target indication rule includes: a current transmission (for example, the fifth transmission) and any three of the above six transmissions (for example, the sixth transmission, the first transmission and the second transmission) determined according to a certain rule.

Further for example, when N is equal to 4, it is assumed that the data packet requires to be transmitted for three times in total (including one initial transmission and two retransmissions), which are respectively referred to as a first transmission, a second transmission and a third transmission. The four transmissions selected according to the target indication rule includes: a current transmission (for example, the first transmission) and any three of the above three transmissions (for example, the second transmission, the third transmission and the first transmission; or the third transmission, the first transmission and the third transmission) determined according to a certain rule.

In conclusion, in the embodiment of the present disclosure, the N transmissions selected according to the target indication rule may include different transmissions, or repeated transmissions, which is not limited herein.

Specifically, according to the embodiment of the present disclosure, the N transmissions as selected are N transmissions including a current transmission.

Further, the N transmissions as selected includes: a current transmission, and N−1 transmissions selected from the current transmission according to a continuous sequential cycle rule, or an odd-even cycle rule, or a preset cycle rule.

The continuous sequential cycle rule specifically refers to:

selecting in sequence, starting from the current transmission and according to serial numbers of transmissions; and skipping to a first one of the transmissions in a case that a last one of the transmissions has been selected, and selecting again in sequence, starting from the first one of the transmissions and according to the serial numbers of the transmissions, in which way cycle is achieved.

The odd-even cycle rule specifically refers to:

selecting in sequence, starting from the current transmission and according to serial numbers of odd-numbered transmissions or serial numbers of even-numbered transmissions; and skipping to a first one of the odd-numbered transmissions or a first one of the even-numbered transmissions in a case that a last one of the odd-numbered transmissions or a last one of the even-numbered transmissions has been selected, and selecting again in sequence, starting from the first one of the odd-numbered transmissions or the first one of the even-numbered transmissions and according to the serial numbers of the odd-numbered transmissions or the serial numbers of the even-numbered transmissions, in which way cycle is achieved.

The preset cycle rule specifically refers to:

selecting one or more transmissions, staring from the current transmission to a last one of the transmissions and according to a first rule; and skipping to a first one of the transmissions that satisfies a second rule in a case that a last one of the transmissions that satisfies the first rule has been selected, and selecting one or more transmissions, starting from the first one of the transmissions that satisfies the second rule and according to the second rule, where the first rule includes selecting in sequence according to serial numbers of the transmissions, or, selecting in sequence according to the serial numbers of transmissions whose serial numbers modulo N1 evaluate to M1, and where the second rule includes selecting in sequence according to the serial numbers of the transmissions, or, selecting in sequence according to the serial numbers of transmissions whose serial numbers modulo N2 evaluate to M2, where N1, N2, M1 and M2 are integers, N1>M1, and N2>M2.

Specifically, the preset cycle rule is self-defined by a network side or a node, and mainly includes the following manners.

The first rule is selecting in sequence according to ordinal numbers of the transmissions, and the second rule is selecting in sequence according to the ordinal numbers of the transmissions. In this manner, the preset cycle rule is the same as the continuous sequential cycle rule.

Optionally, the first rule is selecting in sequence according to the ordinal numbers of the transmissions, and the second rule is selecting in sequence according to ordinal numbers of transmissions which modulo N2 evaluate to M2; for example, selecting in sequence, starting from the current transmission and according to the ordinal numbers of the transmissions, skipping to a first one of the transmissions whose ordinal number modulo 3 evaluate to 0 in a case that a last one of the transmissions has been selected, and selecting again in sequence from the transmissions whose ordinal numbers modulo 3 evaluate to 0, in which way cycle is achieved.

Optionally, the first rule is selecting in sequence according to ordinal numbers of the transmissions which modulo N1 evaluate to M1, and the second rule is selecting in sequence according to the ordinal numbers of the transmissions; for example, selecting in sequence, starting from the current transmission and according to the ordinal numbers of transmissions whose ordinal numbers modulo 3 evaluate to 0, skipping to a first one of the transmissions in a case that a last one of the transmissions whose ordinal number modulo 3 evaluate to 0, and selecting again in sequence, starting from the current transmission and according to the ordinal numbers of the transmissions, in which way cycle is achieved.

Optionally, the first rule is selecting in sequence according to the ordinal numbers of the transmissions which modulo N1 evaluate to M1, and the second rule is selecting in sequence according to ordinal numbers of the transmissions which modulo N2 evaluate to M2. In this manner, when N is equal to 2 and M is equal to 0, the selection is performed in sequence according to ordinal numbers of the transmissions that modulo 2 evaluate to 0, which is consistent with an odd cycle rule in the odd-even cycle rule. When N is equal to 2, and M is equal to 1, the selection is performed in sequence according to ordinal numbers of the transmissions that modulo 2 evaluate to 1, which is consistent with an even cycle rule in the odd-even cycle rule. Further for example, the preset cycle rule is selecting in sequence, from the current transmission and according to ordinal numbers of the transmissions that modulo 3 evaluate to 0, and skipping to a first one of transmissions whose ordanal number modulo 3 evaluate to 0 when a last one of the transmissions whose ordinal number modulo 3 evaluate to 0 has been selected, thereby achieving the loop, in which way cycle is achieved.

It should be noted that the above preset cycle rules are merely optional embodiments, and other manners capable of achieving the cycle are all applicable to the present application, which is not specifically limited herein.

Further, in an embodiment of the present disclosure, prior to step 11, the method further includes:

step 110, receiving a preset indication rule transmitted by a network side, where the preset indication rule includes one or more indication rules; and step 111, selecting one indication rule from the preset indication rule as the target indication rule.

That is, nodes need to determine the currently adopted target indication rule in advance. If the preset indication rule transmitted by the network side contains one indication rule, all the nodes accessed to the network adopt the indication rule (which is referred to as a default rule), without the need of notifying the nodes of the adopted rule every time, and the nodes directly refers to the default rule when decoding the SA. However, in order to meet the diversity of different nodes and/or different data packets, the preset indication rule includes multiple indication rules, and the nodes each need to select one of the indication rules as the target indication rule, thereby achieving indicating transmission resources by the SA.

It should be noted that the preset indication rule transmitted by the network side may be preset by the network side, or the preset indication rule may be preset by the nodes and then notified to the network side, which is not specifically limited herein.

Specifically, when the preset indication rule includes multiple indication rules, the method further includes: transmitting, in the control information, indication information for indicating the target indication rule currently adopted by a node. That is, a rule indication field is added into the control information SA to indicate which indication rule is currently adopted by the node. Specifically, the indication information for indicating the target indication rule currently adopted by the node may be an identifier of the target indication rule. For example, identifier "0" is adopted to represent a first kind of indication rule, and when identifier "0" is in the rule indication field of the SA, the indication rule adopted by the SA may be determined to be the first kind of indication rule by parsing the SA.

Preferably, the transmission resources of the data information in the foregoing embodiments of the present disclosure include a time domain resource of the data information and a frequency domain resource of the data information.

In order to describe the method for indicating the transmission resources according to the present disclosure more clearly, the indication method is described hereinafter in conjunction with an example.

It is assumed that the SA can at most indicate four transmissions, and each data packet is transmitted for 6 times in total. It is also assumed that a field is added into the SA to indicate the indication rule currently adopted by the node.

For example, the preset indication rule includes the following eight types, and identifiers 0, 1, 2, 3, 4, 5, 6, and 7 are adopted to identify the corresponding indication rules as follows:

identifier 0 representing that a current resource is indicated and the other transmission resources corresponding to the data packet are indicated continuously in sequence and circularly;

identifier 1 representing that the current resource is indicated, and the other transmission resources corresponding to the data packet are indicated continuously in an odd-numbered sequence and circularly;

identifier 2 representing that the current resource is indicated, and the other transmission resources corresponding to the data packet are indicated continuously in an even-numbered sequence and circularly;

identifier 3 representing that the current resource is indicated, the subsequent transmission resources corresponding to the data packet are indicated continuously in sequence, and other transmission resources corresponding to the data packet are indicated continuously in an odd-numbered sequence and circularly;

identifier 4 representing that the current resource is indicated, the subsequent transmission resources corresponding to the data packet are indicated continuously in sequence, and other transmission resources corresponding to the data packet are indicated in continuously in an even-numbered sequence and circularly;

identifier 5 representing that the current resource is indicated, the subsequent transmission resources corresponding to the data packet are indicated continuously in sequence, and other transmission resources corresponding to the data packet are indicated continuously and circularly according to an order of the transmissions whose ordinal numbers modulo 3 evaluate to 0;

identifier 6 representing that the current resource is indicated, subsequent transmission resources corresponding to the data packet are indicated continuously in sequence, and other transmission resources corresponding to the data packet are indicated continuously and circularly according to an order of the transmissions whose ordinal numbers modulo 3 evaluate to 1; and identifier 7 representing that the current resource is indicated, subsequent transmission resources corresponding to the data packet are indicated continuously in sequence, and other transmission resources corresponding to the data packet are indicated continuously and circularly according to an order of the transmissions whose ordinal numbers modulo 3 evaluate to 2.

In a case that the rule indication field of the SA includes identifier 0:

if the current transmission is the first transmission, the SA indicating the transmission resources respectively corresponding to the first transmission, the second transmission, the third transmission, and the fourth transmission;

if the current transmission is the second transmission, the SA indicating the transmission resources respectively corresponding to the second transmission, the third transmission, the fourth transmission, and the fifth transmission;

if the current transmission is the third transmission, the SA indicating the transmission resources respectively corresponding to the third transmission, the fourth transmission, the fifth transmission, and the sixth transmission;

if the current transmission is the fourth transmission, the SA indicating the transmission resources respectively corresponding to the fourth transmission, the fifth transmission, the sixth transmission, and the first transmission;

if the current transmission is the fifth transmission, the SA indicating the transmission resources respectively corresponding to the fifth transmission, the sixth transmission, the first transmission, and the second transmission; and if the current transmission is the sixth transmission, the SA indicating the transmission resources respectively corresponding to the sixth transmission, the first transmission, the second transmission, and the third transmission.

In a case that the rule indication field of the SA includes identifier 1:

if the current transmission is the first transmission, the SA indicating the transmission resources respectively corresponding to the first transmission, the third transmission, the fifth transmission, and the first transmission;

if the current transmission is the second transmission, the SA indicating the transmission resources respectively corresponding to the second transmission, the third transmission, the fifth transmission, and the first transmission;

if the current transmission is the third transmission, the SA indicating the transmission resources respectively corresponding to the third transmission, the fifth transmission, the first transmission, and the third transmission;

if the current transmission is the fourth transmission, the SA indicating the transmission resources respectively corresponding to the fourth transmission, the fifth transmission, the first transmission, and the third transmission;

if the current transmission is the fifth transmission, the SA indicating the transmission resources respectively corresponding to the fifth transmission, the first transmission, the third transmission, and the fifth transmission; and if the current transmission is the sixth transmission, the SA indicating the transmission resources respectively corresponding to the sixth transmission, the first transmission, the third transmission, and the fifth transmission.

In a case that the rule indication field of the SA includes identifier 2:

if the current transmission is the first transmission, the SA indicating the transmission resources respectively corresponding to the first transmission, the second transmission, the fourth transmission, and the sixth transmission;

if the current transmission is the second transmission, the SA indicating the transmission resources respectively corresponding to the second transmission, the fourth transmission, the sixth transmission, and the second transmission;

if the current transmission is the third transmission, the SA indicating the transmission resources respectively corresponding to the third transmission, the fourth transmission, the sixth transmission, and the second transmission;

if the current transmission is the fourth transmission, the SA indicating the transmission resources respectively corresponding to the fourth transmission, the sixth transmission, the second transmission, and the fourth transmission;

if the current transmission is the fifth transmission, the SA indicating the transmission resources respectively corresponding to the fifth transmission, the sixth transmission, the second transmission, and the fourth transmission; and if the current transmission is the sixth transmission, the SA indicating the transmission resources respectively corresponding to the sixth transmission, the second transmission, the fourth transmission, and the sixth transmission.

In a case that the rule indication field of the SA includes identifier 3:

if the current transmission is the first transmission, the SA indicating the transmission resources respectively corresponding to the first transmission, the second transmission, the third transmission, and the fourth transmission;

if the current transmission is the second transmission, the SA indicating the transmission resources respectively corresponding to the second transmission, the third transmission, the fourth transmission, and the fifth transmission;

if the current transmission is the third transmission, the SA indicating the transmission resources respectively corresponding to the third transmission, the fourth transmission, the fifth transmission, and the sixth transmission;

if the current transmission is the fourth transmission, the SA indicating the transmission resources respectively corresponding to the fourth transmission, the fifth transmission, the sixth transmission, and the first transmission;

if the current transmission is the fifth transmission, the SA indicating the transmission resources respectively corresponding to the fifth transmission, the sixth transmission, the first transmission, and the third transmission; and if the current transmission is the sixth transmission, the SA indicating the transmission resources respectively corresponding to the sixth transmission, the first transmission, the third transmission, and the fifth transmission.

In a case that the rule indication field of the SA includes identifier 4:

if the current transmission is the first transmission, the SA indicating the transmission resources respectively corresponding to the first transmission, the second transmission, the third transmission, and the fourth transmission;

if the current transmission is the second transmission, the SA indicating the transmission resources respectively corresponding to the second transmission, the third transmission, the fourth transmission, and the fifth transmission;

if the current transmission is the third transmission, the SA indicating the transmission resources respectively corresponding to the third transmission, the fourth transmission, the fifth transmission, and the sixth transmission;

if the current transmission is the fourth transmission, the SA indicating the transmission resources respectively corresponding to the fourth transmission, the fifth transmission, the sixth transmission, and the second transmission;

if the current transmission is the fifth transmission, the SA indicating the transmission resources respectively corresponding to the fifth transmission, the sixth transmission, the second transmission, and the fourth transmission; and if the current transmission is the sixth transmission, the SA indicating the transmission resources respectively corresponding to the sixth transmission, the second transmission, the fourth transmission, and the sixth transmission.

In a case that the rule indication field of the SA includes identifier 5:

if the current transmission is the first transmission, the SA indicating the transmission resources respectively corresponding to the first transmission, the second transmission, the third transmission, and the fourth transmission;

if the current transmission is the second transmission, the SA indicating the transmission resources respectively corresponding to the second transmission, the third transmission, the fourth transmission, and the fifth transmission;

if the current transmission is the third transmission, the SA indicating the transmission resources respectively corresponding to the third transmission, the fourth transmission, the fifth transmission, and the sixth transmission;

if the current transmission is the fourth transmission, the SA indicating the transmission resources respectively corresponding to the fourth transmission, the fifth transmission, the sixth transmission, and the third transmission;

if the current transmission is the fifth transmission, the SA indicating the transmission resources respectively corresponding to the fifth transmission, the sixth transmission, the third transmission, and the sixth transmission; and if the current transmission is the sixth transmission, the SA indicating the transmission resources respectively corresponding to the sixth transmission, the third transmission, the sixth transmission, and the third transmission.

In a case that the rule indication field of the SA includes identifier 6:

if the current transmission is the first transmission, the SA indicating the transmission resources respectively corresponding to the first transmission, the second transmission, the third transmission, and the fourth transmission;

if the current transmission is the second transmission, the SA indicating the transmission resources respectively corresponding to the second transmission, the third transmission, the fourth transmission, and the fifth transmission;

if the current transmission is the third transmission, the SA indicating the transmission resources respectively corresponding to the third transmission, the fourth transmission, the fifth transmission, and the sixth transmission;

if the current transmission is the fourth transmission, the SA indicating the transmission resources respectively corresponding to the fourth transmission, the fifth transmission, the sixth transmission, and the first transmission;

if the current transmission is the fifth transmission, the SA indicating the transmission resources respectively corresponding to the fifth transmission, the sixth transmission, the first transmission, and the fourth transmission; and if the current transmission is the sixth transmission, the SA indicating the transmission resources respectively corresponding to the sixth transmission, the first transmission, the fourth transmission, and the first transmission.

In a case that the rule indication field of the SA includes identifier 7:

if the current transmission is the first transmission, the SA indicating the transmission resources respectively corresponding to the first transmission, the second transmission, the third transmission, and the fourth transmission;

if the current transmission is the second transmission, the SA indicating the transmission resources respectively corresponding to the second transmission, the third transmission, the fourth transmission, and the fifth transmission;

if the current transmission is the third transmission, the SA indicating the transmission resources respectively corresponding to the third transmission, the fourth transmission, the fifth transmission, and the sixth transmission;

if the current transmission is the fourth transmission, the SA indicating the transmission resources respectively corresponding to the fourth transmission, the fifth transmission, the sixth transmission, and the second transmission;

if the current transmission is the fifth transmission, the SA indicating the transmission resources respectively corresponding to the fifth transmission, the sixth transmission, the second transmission, and the fifth transmission; and if the current transmission is the sixth transmission, the SA indicating the transmission resources respectively corresponding to the sixth transmission, the second transmission, the fifth transmission, and the second transmission.

In the above embodiment of the present disclosure, the eight rules require three bits in total for indication. If there is only one pre-configured rule, there is no need to increase the payload of the SA, that is, there is no need to add the rule indication field.

The foregoing embodiment of the present disclosure provides eight different indication manners. In the process of data transmission, the transmitting node may find that a success rate of decoding of one or several transmissions is low based on a self-perception or a third-party feedback, and may want to indicate the one or several transmissions again, and the success rate of decoding may be improved if the receiving terminal caches data packet of the several transmissions. Even if the receiving terminal does not cache the data packet, positions of the indicated resources of the several transmissions may be found by decoding the SA, and these resources may be clearly bypassed when the receiving terminal selects resources, so as to reduce the probability of resource conflicts.

To sum up, the embodiments of the present disclosure provides the method for indicating the transmission resources by the SA in a cyclic manner, the wasted indication field in the SA may be utilized, and the probability of successfully decoding the data packet may be improved while not increasing or slightly increasing the SA payload. Moreover, in a case that the transmission resources are periodically occupied, the receiving node can improve the accuracy of determining a resource occupation status.

Figure 2:
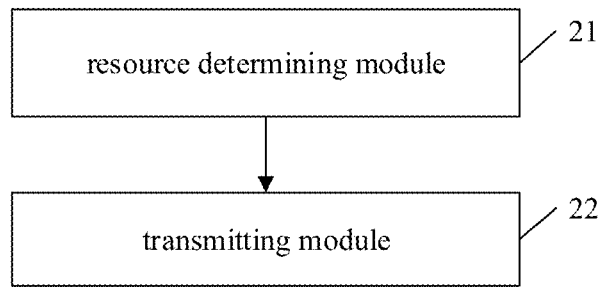
FIG. 2 is a schematic structural diagram of a device for indicating transmission resources according to an embodiment of the present disclosure.

As shown in FIG. 2, a device for indicating transmissions is provided according to an embodiment of the present disclosure. The device includes:

a resource determining module 21, configured to select N transmissions according to a target indication rule, and determine N transmission resources of data information of a data packet corresponding to the N transmissions as selected, where N is the maximum quantity of transmissions capable of being indicated by control information for indicating transmission resources, and N is an integer greater than or equal to 2; and a transmitting module 22, configured to transmit, in the control information, the N transmission resources as determined.

Specifically, according to an embodiment of the present disclosure, the device further includes:

a receiving module, configured to receive a preset indication rule transmitted by a network side, where the preset indication rule including one or more indication rules; and a selecting module, configured to select one indication rule from the preset indication rule as the target indication rule.

Specifically, according to an embodiment of the present disclosure, the transmitting module is further configured to transmit, in the control information, indication information for indicating the target indication rule currently adopted by a node, in a case that the preset indication rule includes multiple indication rules.

Specifically, according to an embodiment of the present disclosure, the transmission resources of the data information include a time-domain resource of the data information and a frequency-domain resource of the data information.

Specifically, according to an embodiment of the present disclosure, the N transmissions as selected are N transmissions including a current transmission.

Specifically, according to an embodiment of the present disclosure, the N transmissions as selected includes a current transmission, and N−1 transmissions selected from the current transmission according to a continuous sequential cycle rule, or an odd-even cycle rule, or a preset cycle rule.

Specifically, according to an embodiment of the present disclosure, the continuous sequential cycle rule includes:

selecting in sequence, starting from the current transmission and according to serial numbers of transmissions; and skipping to a first one of the transmissions in a case that a last one of the transmissions has been selected, and selecting again in sequence, starting from the first one of the transmissions and according to the serial numbers of the transmissions.

Specifically, according to an embodiment of the present disclosure, the odd-even cycle rule includes:

selecting in sequence, starting from the current transmission and according to serial numbers of odd-numbered transmissions or serial numbers of even-numbered transmissions; and skipping to a first one of the odd-numbered transmissions or a first one of the even-numbered transmissions in a case that a last one of the odd-numbered transmissions or a last one of the even-numbered transmissions has been selected, and selecting again in sequence, starting from the first one of the odd-numbered transmissions or the first one of the even-numbered transmissions and according to the serial numbers of the odd-numbered transmissions or the serial numbers of the even-numbered transmissions.

Specifically, according to an embodiment of the present disclosure, the preset cycle rule includes:

selecting one or more transmissions, staring from the current transmission to a last one of the transmissions and according to a first rule; and skipping to a first one of the transmissions that satisfies a second rule in a case that a last one of the transmissions that satisfies the first rule has been selected, and selecting one or more transmissions, starting from the first one of the transmissions that satisfies the second rule and according to the second rule, where the first rule includes selecting in sequence according to serial numbers of the transmissions, or, selecting in sequence according to the serial numbers of transmissions whose serial numbers modulo N1 evaluate to M1, and where the second rule includes selecting in sequence according to the serial numbers of the transmissions, or, selecting in sequence according to the serial numbers of transmissions whose serial numbers modulo N2 evaluate to M2, where N1, N2, M1 and M2 are integers, N1>M1, and N2>M2.

In conclusion, the embodiments of the present disclosure provides the method for indicating the transmission resources by the SA in a cyclic manner, the wasted indication field in the SA may be utilized, and the probability of successfully decoding the data packet is improved while not increasing or slightly increasing the SA payload. Moreover, in a case that the transmission resources are periodically occupied, the receiving node can improve the accuracy of determining a resource occupation status.

It should be noted that the device for indicating the transmission resources according to the embodiments of the present disclosure is a device for indicating which applies the method for indicating the transmission resources according to the above embodiments, all the above embodiments about the method for indicating the transmission resources are applicable to the device for indicating, and the same or similar beneficial effects can be achieved.

Figure 3:
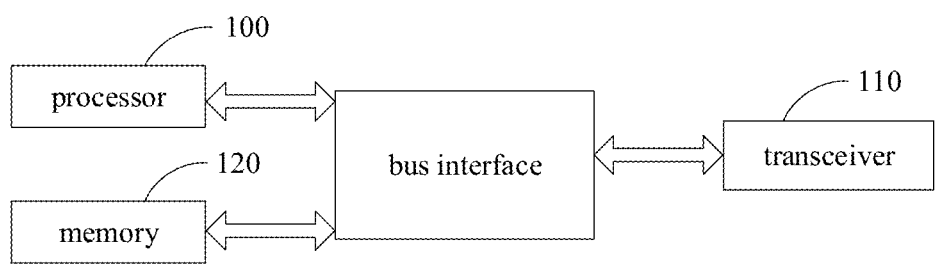
FIG. 3 is a schematic structural diagram of a device for indicating transmission resources according to an embodiment of the present disclosure.

In order to better achieve the above objective, as shown in FIG. 3, a device for indicating transmission resources is further provided according to another embodiment of the present disclosure. The device includes: a processor 100; a memory 120 connected to the processor 100 via a bus interface; and a transceiver 110 connected to the processor 100 via the bus interface. The memory is configured to store programs and data used by the processor when performing operations. Control information and data information are transmitted via the transceiver 110. When the programs and the data stored in the memory are called and executed by the processor, the following functional modules are achieved:

a resource determining module, configured to select N transmissions according to a target indication rule, and determine N transmission resources of data information of one data packet corresponding to the N transmissions as selected, where N is the maximum quantity of transmissions indicated by control information for indicating transmission resources, and N is an integer greater than or equal to 2; and a transmitting module, configured to transmit, in the control information, the N transmission resources as determined.

As shown in FIG. 3, a bus architecture may include an arbitrary quantity of buses and bridges connected to each other. Various circuits of one or more processors represented by the processor 100 and a memory represented by the memory 120 are coupled. The bus architecture may also couple other circuits together, such as peripheral equipment, a voltage regulator, a power management circuit, which are well known in the art and are not described herein. The bus interface provides an interface. The transceiver 110 may include multiple components, for example, including a transmitter and a receiver. The transceiver 110 provides a unit configured to communication with other devices on a transmission medium. The processor 100 is in charge of management of the bus architecture and general processing. The memory 120 may store data used by the processor 100 when performing operations.

The processor 100 is in charge of management of the bus architecture and general processing. The memory 120 may store data used by the processor 100 when performing operations.

It should be noted that the device for indicating the transmission resources provided by this embodiment of the present disclosure is a physical device of the device for indicating the transmission resources provided by the above embodiments of the present disclosure, all the above embodiments about the device for indicating the transmission resources are applicable to this device for indicating, and the same or similar beneficial effects can be achieved.

Optional embodiments of the present disclosure are described hereinabove. It should be noted that a person skill in the art can make various improvements and polishments without departing from the principle of the present disclosure, and these improvements and polishments shall fall within the protection scope of the present disclosure.

What is claimed is:

1. A method for indicating sidelink transmission resources, comprising:
    selecting N transmissions according to a target indication rule, and determining N transmission resources of data information of a data packet corresponding to the N transmissions as selected, where N is a maximum quantity of transmissions that control information for indicating transmission resources is capable of indicating, N is less than M, M is a total quantity of transmissions of the data information of the data packet, the M transmissions of the data information of the data packet comprises an initial transmission and M–1 retransmissions, and N is an integer greater than or equal to 2; and
    transmitting, in the control information, information for indicating the N transmission resources as determined;
    wherein the N transmissions as selected comprises a current transmission, and N–1 transmissions selected from the current transmission according to a continuous sequential cycle rule, or an odd-even cycle rule, or a preset cycle rule; or,
    the N transmissions as selected comprises a current transmission, and N–1 transmissions selected from the current transmission according to a continuous sequential rule, or an odd-even rule, or a preset rule;
    wherein the continuous sequential cycle rule comprises:
        selecting in sequence, starting from the current transmission and according to serial numbers of transmissions; and
        skipping to a first one of the transmissions in response to determining that a last one of the transmissions has been selected, and selecting again in sequence, starting from the first one of the transmissions and according to the serial numbers of the transmissions;
    or,
    wherein the odd-even cycle rule comprises:
        selecting in sequence, starting from the current transmission and according to serial numbers of odd-numbered transmissions; and
        skipping to a first one of the odd-numbered transmissions in response to determining that a last one of the odd-numbered transmissions has been selected, and selecting again in sequence, starting from the first one of the odd-numbered transmissions and according to the serial numbers of the odd-numbered transmissions; or,
        the odd-even cycle rule comprises:
        selecting in sequence, starting from the current transmission and according to serial numbers of even-numbered transmissions; and
        skipping to a first one of the even-numbered transmissions in response to determining that a last one of the even-numbered transmissions has been selected, and selecting again in sequence, starting from the first one of the even-numbered transmissions and according to the serial numbers of the even-numbered transmissions;
    or,
    wherein the preset cycle rule comprises:
        selecting one or more transmissions, staring from the current transmission to a last one of the transmissions and according to a first rule; and
        skipping to a first one of the transmissions that satisfies a second rule in response to determining that a last one of the transmissions that satisfies the first rule has been selected, and
        selecting one or more transmissions, starting from the first one of the transmissions that satisfies the second rule and according to the second rule,
        wherein the first rule comprises selecting in sequence according to serial numbers of the transmissions, or, selecting in sequence according to the serial numbers of transmissions whose serial numbers modulo N1 evaluate to M1, and wherein the second rule comprises selecting in sequence according to the serial numbers of the transmissions, or, selecting in sequence according to the serial numbers of transmissions whose serial numbers modulo N2 evaluate to M2, where N1, N2, M1 and M2 are integers, N1>M1, and N2>M2;
    or,
    wherein the continuous sequential rule comprises:
        selecting in sequence, starting from the current transmission and according to serial numbers of transmissions;
    or,
    wherein the odd-even rule comprises:
        selecting in sequence, starting from the current transmission and according to serial numbers of odd-numbered transmissions or serial numbers of even-numbered transmissions;
    or,
    wherein the preset rule comprises:
        selecting one or more transmissions, staring from the current transmission to a last one of the transmissions and according to a first rule, the first rule comprises selecting in sequence according to serial numbers of the transmissions, or, selecting in sequence according to the serial numbers of transmissions whose serial numbers modulo N1 evaluate to M1, where N1 and M1 are integers.

2. The method according to claim 1, wherein, before selecting the N transmissions according to the target indication rule, the method further comprises:
    receiving a preset indication rule transmitted by a network side, wherein the preset indication rule comprises one or more indication rules; and
    selecting one indication rule from the preset indication rule as the target indication rule.

3. The method according to claim 2, wherein in response to determining that the preset indication rule comprises a plurality of indication rules, when transmitting, in the control information, information for indicating the N transmission resources as determined, the method further comprises:
    transmitting, in the control information, indication information for indicating the target indication rule currently adopted by a node.

4. The method according to claim 1, wherein the transmission resources of the data information comprise a time-domain resource of the data information and a frequency-domain resource of the data information.

5. A device for indicating sidelink transmission resources, comprising:
a processor; and
a transceiver, configured to transmit and receive data under control of the processor,
wherein the processor is configured to:
select N transmissions according to a target indication rule, and determine N transmission resources of data information of a data packet corresponding to the N transmissions as selected, where N is a maximum quantity of transmissions that control information for indicating transmission resources is capable of indicating, N is less than M, M is a total quantity of transmissions of the data information of the data packet, the M transmissions of the data information of the data packet comprises an initial transmission and M−1 retransmissions, and N is an integer greater than or equal to 2; and
transmit, in the control information, information for indicating the N transmission resources as determined;
wherein the N transmissions as selected comprises a current transmission, and N−1 transmissions selected from the current transmission according to a continuous sequential cycle rule, or an odd-even cycle rule, or a preset cycle rule; or,
the N transmissions as selected comprises a current transmission, and N−1 transmissions selected from the current transmission according to a continuous sequential rule, or an odd-even rule, or a preset rule;
wherein the continuous sequential cycle rule comprises:
selecting in sequence, starting from the current transmission and according to serial numbers of transmissions; and
skipping to a first one of the transmissions in response to determining that a last one of the transmissions has been selected, and selecting again in sequence, starting from the first one of the transmissions and according to the serial numbers of the transmissions;
or,
wherein the odd-even cycle rule comprises:
selecting in sequence, starting from the current transmission and according to serial numbers of odd-numbered transmissions; and
skipping to a first one of the odd-numbered transmissions in response to determining that a last one of the odd-numbered transmissions has been selected, and selecting again in sequence, starting from the first one of the odd-numbered transmissions and according to the serial numbers of the odd-numbered transmissions; or,
the odd-even cycle rule comprises:
selecting in sequence, starting from the current transmission and according to serial numbers of even-numbered transmissions; and
skipping to a first one of the even-numbered transmissions in response to determining that a last one of the even-numbered transmissions has been selected, and selecting again in sequence, starting from the first one of the even-numbered transmissions and according to the serial numbers of the even-numbered transmissions;
or,
wherein the preset cycle rule comprises:
selecting one or more transmissions, staring from the current transmission to a last one of the transmissions and according to a first rule; and
skipping to a first one of the transmissions that satisfies a second rule in response to determining that a last one of the transmissions that satisfies the first rule has been selected, and
selecting one or more transmissions, starting from the first one of the transmissions that satisfies the second rule and according to the second rule,
wherein the first rule comprises selecting in sequence according to serial numbers of the transmissions, or, selecting in sequence according to the serial numbers of transmissions whose serial numbers modulo N1 evaluate to M1, and wherein the second rule comprises selecting in sequence according to the serial numbers of the transmissions, or, selecting in sequence according to the serial numbers of transmissions whose serial numbers modulo N2 evaluate to M2, where N1, N2, M1 and M2 are integers, N1>M1, and N2>M2;
or,
wherein the continuous sequential rule comprises:
selecting in sequence, starting from the current transmission and according to serial numbers of transmissions;
or,
wherein the odd-even rule comprises:
selecting in sequence, starting from the current transmission and according to serial numbers of odd-numbered transmissions or serial numbers of even-numbered transmissions;
or,
wherein the preset rule comprises:
selecting one or more transmissions, staring from the current transmission to a last one of the transmissions and according to a first rule, the first rule comprises selecting in sequence according to serial numbers of the transmissions, or, selecting in sequence according to the serial numbers of transmissions whose serial numbers modulo N1 evaluate to M1, where N1 and M1 are integers.

6. The device according to claim 5, wherein the processor is further configured to:
receive a preset indication rule transmitted by a network side, wherein the preset indication rule comprising one or more indication rules; and
select one indication rule from the preset indication rule as the target indication rule.

7. The device according to claim 6, wherein the processor is configured to transmit, in the control information, indication information for indicating the target indication rule currently adopted by a node, in response to determining that the preset indication rule comprises a plurality of indication rules.

8. The device according to claim 5, wherein the transmission resources of the data information comprise a time-domain resource of the data information and a frequency-domain resource of the data information.

9. A non-transitory computer readable storage medium, storing computer readable instructions executable by a processor, wherein when the computer readable instructions are executed by the processor, the processor is configured to perform a method for indicating sidelink transmission resources, wherein the method comprises:
selecting N transmissions according to a target indication rule, and determining N transmission resources of data information of a data packet corresponding to the N transmissions as selected, where N is a maximum quantity of transmissions that control information for indicating transmission resources is capable of indicating, N is less than M, M is a total quantity of transmissions of the data information of the data packet, the M transmissions of the data information of the data packet comprises an initial transmission and M−1 retransmissions, and N is an integer greater than or equal to 2; and transmitting, in the control information, information for indicating the N transmission resources as determined;

wherein the N transmissions as selected comprises a current transmission, and N−1 transmissions selected from the current transmission according to a continuous sequential cycle rule, or an odd-even cycle rule, or a preset cycle rule; or, the N transmissions as selected comprises a current transmission, and N−1 transmissions selected from the current transmission according to a continuous sequential rule, or an odd-even rule, or a preset rule;

wherein the continuous sequential cycle rule comprises:
selecting in sequence, starting from the current transmission and according to serial numbers of transmissions; and
skipping to a first one of the transmissions in response to determining that a last one of the transmissions has been selected, and selecting again in sequence, starting from the first one of the transmissions and according to the serial numbers of the transmissions;

or, wherein the odd-even cycle rule comprises:
selecting in sequence, starting from the current transmission and according to serial numbers of odd-numbered transmissions; and
skipping to a first one of the odd-numbered transmissions in response to determining that a last one of the odd-numbered transmissions has been selected, and selecting again in sequence, starting from the first one of the odd-numbered transmissions and according to the serial numbers of the odd-numbered transmissions; or, the odd-even cycle rule comprises:
selecting in sequence, starting from the current transmission and according to serial numbers of even-numbered transmissions; and
skipping to a first one of the even-numbered transmissions in response to determining that a last one of the even-numbered transmissions has been selected, and selecting again in sequence, starting from the first one of the even-numbered transmissions and according to the serial numbers of the even-numbered transmissions;

or, wherein the preset cycle rule comprises:
selecting one or more transmissions, staring from the current transmission to a last one of the transmissions and according to a first rule; and
skipping to a first one of the transmissions that satisfies a second rule in response to determining that a last one of the transmissions that satisfies the first rule has been selected, and selecting one or more transmissions, starting from the first one of the transmissions that satisfies the second rule and according to the second rule, wherein the first rule comprises selecting in sequence according to serial numbers of the transmissions, or, selecting in sequence according to the serial numbers of transmissions whose serial numbers modulo N1 evaluate to M1, and wherein the second rule comprises selecting in sequence according to the serial numbers of the transmissions, or, selecting in sequence according to the serial numbers of transmissions whose serial numbers modulo N2 evaluate to M2, where N1, N2, M1 and M2 are integers, N1>M1, and N2>M2;

or, wherein the continuous sequential rule comprises:
selecting in sequence, starting from the current transmission and according to serial numbers of transmissions;

or, wherein the odd-even rule comprises:
selecting in sequence, starting from the current transmission and according to serial numbers of odd-numbered transmissions or serial numbers of even-numbered transmissions;

or, wherein the preset rule comprises:
selecting one or more transmissions, staring from the current transmission to a last one of the transmissions and according to a first rule, the first rule comprises selecting in sequence according to serial numbers of the transmissions, or, selecting in sequence according to the serial numbers of transmissions whose serial numbers modulo N1 evaluate to M1, where N1 and M1 are integers.

10. The non-transitory computer readable storage medium according to claim 9, wherein, before selecting the N transmissions according to the target indication rule, the method further comprises:
receiving a preset indication rule transmitted by a network side, wherein the preset indication rule comprises one or more indication rules; and
selecting one indication rule from the preset indication rule as the target indication rule.

11. The non-transitory computer readable storage medium according to claim 10, wherein in response to determining that the preset indication rule comprises a plurality of indication rules, when transmitting, in the control information, information for indicating the N transmission resources as determined, the method further comprises: transmitting, in the control information, indication information for indicating the target indication rule currently adopted by a node, in response to determining that the preset indication rule comprises a plurality of indication rules.

12. The non-transitory computer readable storage medium according to claim 9, wherein the transmission resources of the data information comprise a time-domain resource of the data information and a frequency-domain resource of the data information.

* * * * *